United States Patent
Nonaka et al.

(10) Patent No.: US 9,135,709 B2
(45) Date of Patent: Sep. 15, 2015

(54) VEHICLE-TO-VEHICLE DISTANCE CALCULATION APPARATUS AND METHOD

(71) Applicant: FUJIFILM Corporation, Tokyo (JP)

(72) Inventors: Shunichiro Nonaka, Tokyo (JP); Yuko Matsui, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/170,131

(22) Filed: Jan. 31, 2014

(65) Prior Publication Data

US 2014/0241579 A1 Aug. 28, 2014

(30) Foreign Application Priority Data

Feb. 28, 2013 (JP) ................................. 2013-038687

(51) Int. Cl.
| | |
|---|---|
| G06K 9/00 | (2006.01) |
| G06T 7/00 | (2006.01) |
| G06T 7/60 | (2006.01) |
| G06K 9/32 | (2006.01) |
| B60Q 1/00 | (2006.01) |

(52) U.S. Cl.
CPC .......... *G06T 7/0042* (2013.01); *G06K 9/00805* (2013.01); *G06K 9/3241* (2013.01); *G06T 7/0051* (2013.01); *G06T 7/602* (2013.01); *G06T 2207/10016* (2013.01); *G06T 2207/30252* (2013.01)

(58) Field of Classification Search
CPC .................................... G06K 9/00; G06T 7/00
USPC .......... 382/103, 104, 107, 236; 348/169, 170, 348/171, 172, 352; 340/435, 937
See application file for complete search history.

(56) References Cited

U.S. PATENT DOCUMENTS

| | | | | |
|---|---|---|---|---|
| 8,164,628 | B2* | 4/2012 | Stein et al. | ..................... 348/148 |
| 8,378,851 | B2* | 2/2013 | Stein et al. | ..................... 340/937 |
| 2007/0154068 | A1 | 7/2007 | Stein et al. | |
| 2011/0298602 | A1 | 12/2011 | Chen et al. | |
| 2012/0200707 | A1 | 8/2012 | Stein et al. | |

FOREIGN PATENT DOCUMENTS

| | | |
|---|---|---|
| JP | H 1997-048298 A | 2/1997 |
| JP | 2002-327635 A | 11/2002 |
| JP | 2003-077099 A | 3/2003 |
| JP | 2005-030925 A | 2/2005 |
| JP | 2006-48338 A | 2/2006 |
| JP | 2007-199932 A | 8/2007 |
| JP | 2007-0309799 A | 11/2007 |
| JP | 2013-057992 A | 3/2013 |
| JP | 2013-109455 A | 6/2013 |

OTHER PUBLICATIONS

Japanese Office Action dated Jan. 31, 2014 with English Translation.

* cited by examiner

*Primary Examiner* — Abolfazl Tabatabai
(74) *Attorney, Agent, or Firm* — McGinn IP Law Group, PLLC (57) ABSTRACT

The distance to a target vehicle is calculated comparatively accurately. To achieve this, a target vehicle traveling ahead of one's own vehicle is imaged by a camera and it is determined to what vehicle group the image of the target vehicle belongs. A first distance from one's own vehicle to the target vehicle is calculated by a circuit using the representative vehicle width of the vehicle group decided. A vanishing point is detected from the captured image by a vanishing point detection circuit and a second distance from one's own vehicle to the target vehicle is calculated utilizing the vanishing point. The distance to the target vehicle is decided from the first and second distances by a distance decision circuit, wherein the shorter the distance to the vanishing point, the more the value of a weighting coefficient of the second distance is reduced.

5 Claims, 10 Drawing Sheets

| VEHICLE GROUP | VEHICLE WIDTH |
|---|---|
| LIGHT-DUTY VEHICLE | w1 |
| STANDARD PASSENGER CAR | w2 |
| HEAVY-DUTY VEHICLE (TRUCK, BUS) | w3 |
| MOTORCYCLE | w4 |
| BICYCLE | w5 |

| DISTANCE TO VANISHING POINT | WEIGHTING COEFFICIENT k |
|---|---|
| SHORT | k1 |
| MEDIUM | k2 |
| LONG | k3 |

VEHICLE-TO-VEHICLE DISTANCE CALCULATION APPARATUS AND METHOD

BACKGROUND OF THE INVENTION

1. Field of the Invention

This invention relates to a vehicle-to-vehicle distance calculation apparatus and method.

2. Description of the Related Art

Calculation of vehicle-to-vehicle distance is important in order to prevent vehicular accidents. In order to achieve this, there is a system that detects the shadow of the vehicle traveling ahead of one's own vehicle and calculates vehicle-to-vehicle distance using the position of the shadow and a vanishing point (Patent Document 1). Further, there is a system that detects an obstacle by utilizing a vanishing point (Patent Document 2) and a system that detects whether an object is a moving body by utilizing a vanishing point (Patent Document 3).

[Patent Document 1]: Japanese Patent Application Laid-Open No. 2002-327635

[Patent Document 2]: Japanese Patent Application Laid-Open No. 2007-199932

[Patent Document 3]: Japanese Patent Application Laid-Open No. 2006-48338

However, since the position of the shadow of the vehicle traveling ahead must be detected in Patent Document 1, the system is comparatively complex and cost of development is high. In addition, there are instances where it takes too much time to calculate distance. Furthermore, since it is difficult to detect a shadow at night or on a snow-covered road, etc., there are instances where distance cannot be calculated. Further, in both Patent Documents 1 and 2, no consideration is given to calculation of vehicle-to-vehicle distance in a comparatively simple and accurate manner.

SUMMARY OF THE INVENTION

An object of the present invention is to calculate vehicle-to-vehicle distance comparatively simply and accurately.

A vehicle-to-vehicle distance calculation apparatus according to the present invention comprises: an imaging control device (imaging control means) for controlling a camera, which has been mounted on one's own vehicle, so as to image a target vehicle present ahead of one's own vehicle; a vehicle group decision device (vehicle group decision means) for deciding to what group the target vehicle belongs based upon an image obtained by imaging by the camera; a target vehicle pixel count calculation device (target vehicle pixel count calculation means) for calculating number of width or height pixels of a target image contained in an image obtained by imaging by the camera; a first distance calculation device (first calculation means) for calculating the distance to the target vehicle based upon a representative vehicle width or vehicle height of the vehicle group decided by the vehicle group decision device, the number of pixels calculated by the target vehicle pixel count calculation device and the number of width or height pixels of the image obtained by imaging by the camera; a target-vehicle image detection device (target-vehicle image detection means) for detecting a target-vehicle image, which represents a target vehicle, from within the image obtained by imaging by the camera; a vanishing point detection device (vanishing point detection means) for detecting a vanishing point from within the image obtained by imaging by the camera; a second distance calculation device (second distance calculation means) for calculating the distance to the target vehicle based upon a position of at least one of an upper edge and lower edge of the target-vehicle image detected by the target-vehicle image detection device and position of the vanishing point detected by the vanishing point detection device; and a distance decision device (distance decision means) for deciding the distance to the target vehicle from the first distance calculated by the first distance calculation device and the second distance calculated by the second distance calculation device upon applying weighting such that the closer together the position of the target-vehicle image detected by the target-vehicle image detection device and position of the vanishing point detected by the vanishing point detection device, the smaller the weight of the second distance calculated by the second distance calculation device becomes.

The invention also provides a vehicle-to-vehicle distance calculation method. Specifically, the invention provides a method of calculating vehicle-to-vehicle distance, comprising steps of: controlling a camera, which has been mounted on one's own vehicle, so as to image a target vehicle present ahead of one's own vehicle; deciding to what group the target vehicle belongs based upon an image obtained by imaging by the camera; calculating number of width or height pixels of a target image contained in an image obtained by imaging by the camera; calculating the distance to the target vehicle based upon a representative vehicle width or vehicle height of the vehicle group decided, the number of pixels calculated and the number of width or height pixels of the image obtained by imaging by the camera; detecting a target-vehicle image, which represents a target vehicle, from within the image obtained by imaging by the camera; detecting a vanishing point from within the image obtained by imaging by the camera; calculating the distance to the target vehicle based upon a position of at least one of an upper edge and lower edge of the target-vehicle image detected and position of the vanishing point detected; and deciding the distance to the target vehicle from the first distance calculated and the second distance calculated upon applying weighting such that the closer together the position of the target-vehicle image detected and position of the vanishing point detected, the smaller the weight of the second distance calculated becomes.

In accordance with the present invention, a target vehicle located ahead of one's own vehicle is imaged and to what vehicle group the target vehicle belongs is decided from the image obtained by imaging. Further, the number of width or height pixels of the image of the target vehicle contained in the image obtained by imaging is calculated. The distance from one's own vehicle to the target vehicle is calculated based upon a representative vehicle width or vehicle height of the vehicle group decided, the calculated number of width or height pixels of the target vehicle and the number of width or height pixels of the image obtained by imaging. For example, a vehicle group is a group classified according to the width or height of a vehicle such as a light-duty automobile, standard passenger car, heavy-duty vehicle such as a truck or bus, motorcycle or bicycle and can be said to correspond to the class of driver's license. In accordance with the present invention, to what vehicle group a target vehicle belongs is decided and a first distance to the target vehicle is calculated utilizing the representative vehicle width or height of the vehicle group decided.

Furthermore, in an accordance with the present invention, the target vehicle ahead of one's own vehicle is imaged. A second distance to the target vehicle is calculated based upon a position of at least one of an upper edge and lower edge of a target-vehicle image, which represents the target vehicle from within the captured image, and the position of the vanishing point.

The distance to the target vehicle is decided from the calculated first and second distances in such a manner that the shorter the distance from the target-vehicle image to the vanishing point, the smaller the weight of the second distance. In a case where the target-vehicle image exists near the vanishing point, any error in detection of the vanishing point exerts a large influence upon the calculation of the second distance. In accordance with the present invention, however, if the target-vehicle image exists near the vanishing point, the distance to the target vehicle is decided from the first and second distances upon lowering the weighting of the second distance.

The apparatus may further comprise a vehicle memory in which representative vehicle widths or vehicle heights have been stored beforehand on a per-vehicle-group basis. In this case, the first distance calculation device would calculate the distance to the target vehicle based upon a representative vehicle width or vehicle height of the vehicle group, which has been decided by the vehicle group decision device, from among the representative vehicle widths or vehicle heights that have been stored in the vehicle memory, the number of pixels calculated by the target vehicle pixel count calculation device, and the number of width or height pixels of the image obtained by imaging by the camera.

The first distance calculation device may include a third distance calculation device for calculating a third distance to the target vehicle based upon the upper edge of the target-vehicle image detected by the target-vehicle image detection device and the position of the vanishing point detected by the vanishing point detection device; and a fourth distance calculation device for calculating a fourth distance to the target vehicle based upon the lower edge of the target-vehicle image detected by the target-vehicle image detection device and the position of the vanishing point detected by the vanishing point detection device. In this case, the distance to the target vehicle would be calculated based upon the third distance calculated by the third distance calculation device and the fourth distance calculated by the fourth distance calculation device.

The apparatus may further comprise: a determination device (determination means) for determining whether a tire of the target vehicle is absent below the lower edge of the target vehicle detected by the target-vehicle image detection device; and a correction device for correcting the position of the lower edge of the target vehicle, which has been detected by the target-vehicle image detection device, in response to a determination by the determination device that a tire is absent. In this case, the second distance calculation device would calculate the distance to the target vehicle using the position of the lower edge corrected by the correction device.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
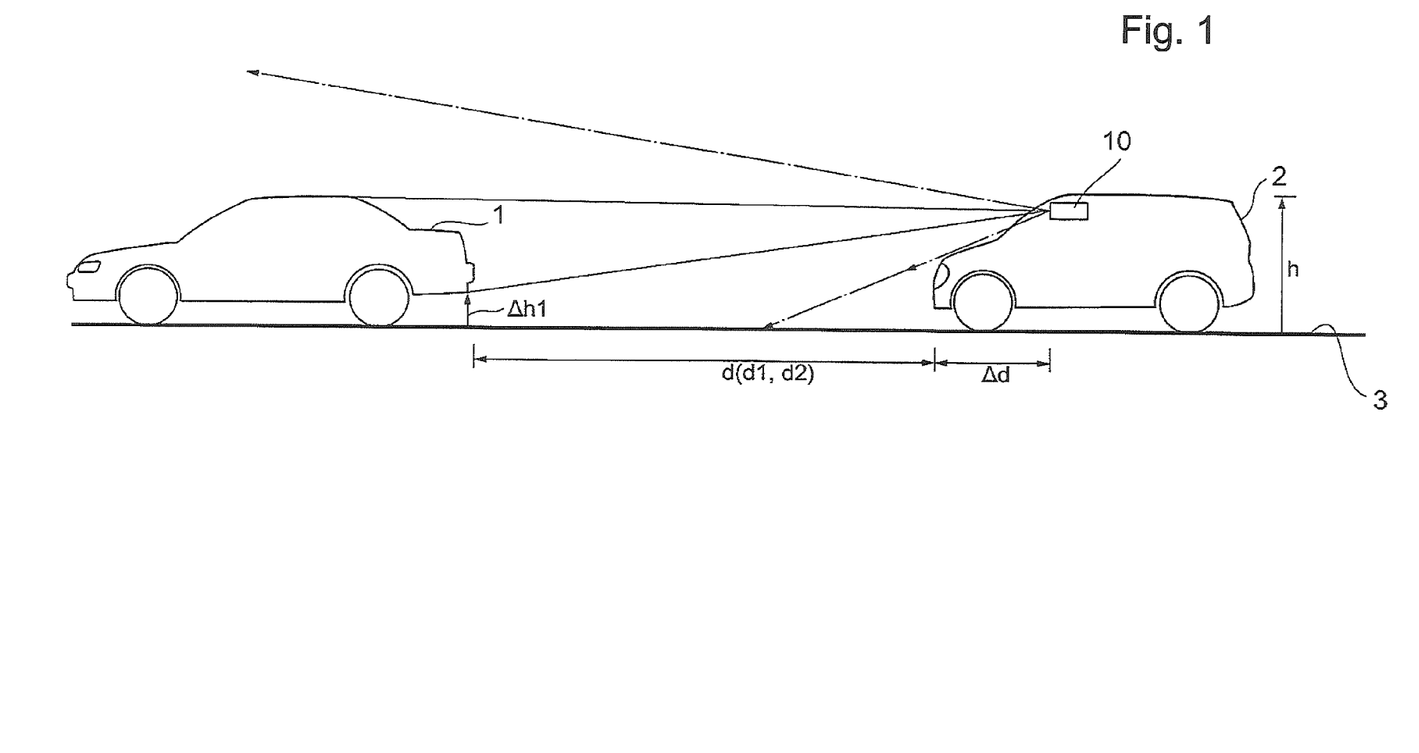
FIG. 1 illustrates the relationship between one's own vehicle and a target vehicle.

FIG. 1 represents in side view the relationship between one's own vehicle 2 and a target vehicle 1 traveling ahead of the vehicle 2.

One's own vehicle (an automotive vehicle) 2 is traveling on a road 3 and the target vehicle (an automotive vehicle) 1, whose vehicle-to-vehicle distance d is to be calculated, is traveling ahead of one's own vehicle 2.

A camera 10 is mounted within one's own vehicle 2 at the forward end near the top of the vehicle at a position having a height h. The target vehicle traveling ahead of one's own vehicle 2 is imaged by the camera 10. Vehicle-to-vehicle distance d from one's own vehicle 2 to the target vehicle 1 is calculated based upon the image captured by the camera 10. The distance from the position at which the camera 10 is mounted to the front end of one's own vehicle 2 is Δd.

Figure 2:
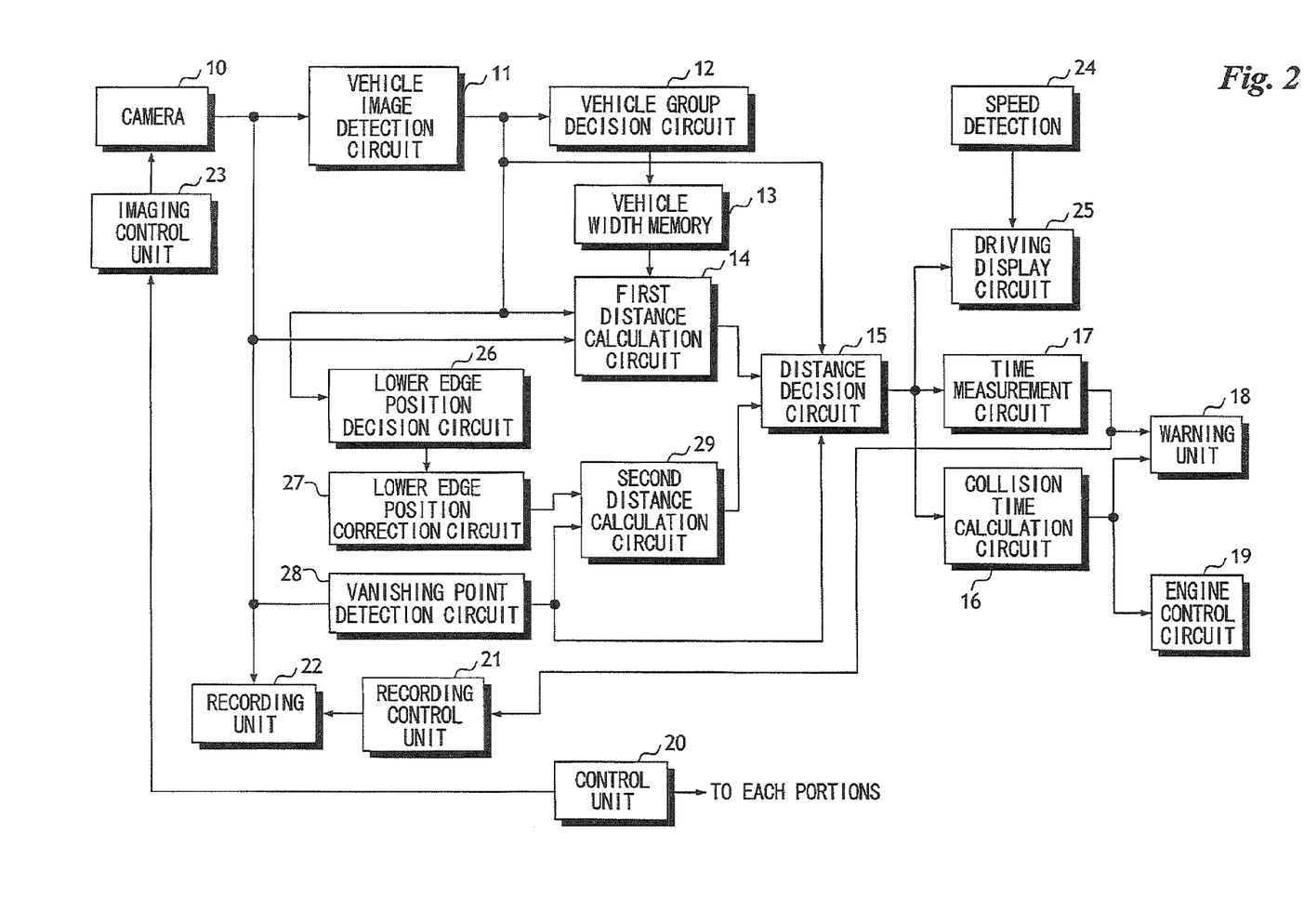
FIG. 2 is a block diagram illustrating the electrical configuration of a vehicle-to-vehicle distance calculation apparatus.

FIG. 2 is a block diagram illustrating the electrical configuration of a vehicle-to-vehicle distance calculation apparatus.

In this embodiment, first and second distance calculations are performed. In the first distance calculation, the vehicle group (light-duty vehicle, standard passenger car, heavy-duty vehicle) of the target vehicle is decided and the distance to the distance to the target vehicle 1 is calculated utilizing the vehicle group. In the second distance calculation, a vanishing point is detected and the distance to the distance to the target vehicle 1 is calculated utilizing the vanishing point. The vehicle-to-vehicle distance d to the target vehicle is calculated based upon a first vehicle-to-vehicle distance d1 obtained in the first distance calculation and a second vehicle-to-vehicle distance d2 obtained in the second distance calculation.

The first distance calculation will be described first.

The overall operation of the vehicle-to-vehicle distance calculation apparatus is controlled by a control unit 20.

The camera 10 is controlled by an imaging control unit 23. The target vehicle 1 traveling (stopped) ahead of one's own vehicle 2 is imaged by the camera 10.

Figure 3:
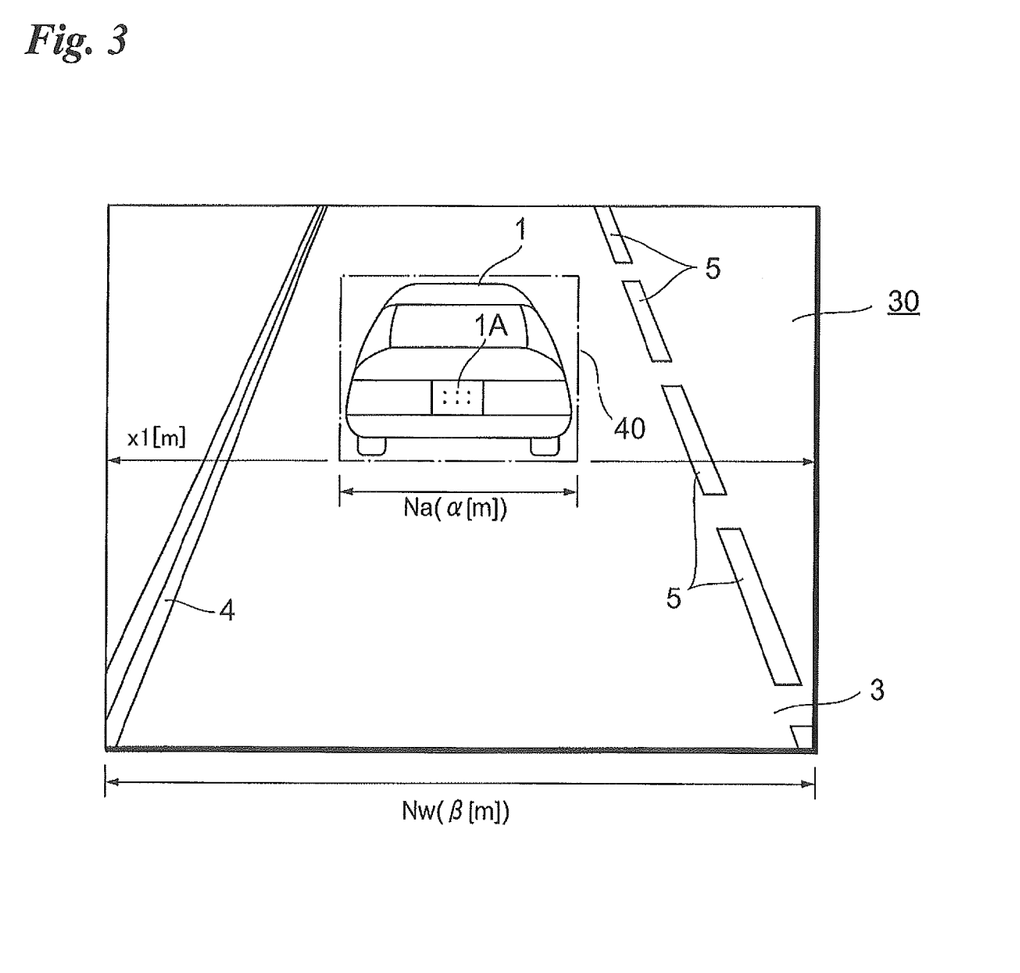
FIG. 3 is an example of an image obtained by imaging.

FIG. 3 is an example of an image 30 obtained by imaging.

In the image 30, a target-vehicle image 1 (indicated by the same reference numeral as that of the target vehicle 1) of the target vehicle 1 traveling ahead is represented on a road image 3 (indicated by the same reference numeral as that of the road 3) representing the road 3. The target-vehicle image 1 includes also an image 1A of a license plate. An image 4 of a roadway boundary block and an image 5 of the center line of the road are shown bracketing the target-vehicle image 1.

As will be described later, vehicle detection processing is executed based upon the image 30 to thereby detect the target-vehicle image 1. Also displayed in FIG. 3 is a vehicle frame 40 indicating the fact that the target-vehicle image 1 has been detected.

With reference again to FIG. 2, image data representing the image 30 captured by the camera 10 is input to a vehicle image detection circuit 11. In the vehicle image detection circuit 11, the target-vehicle image 1 is detected from within the image 30 as mentioned above. Data representing the detected target-vehicle image 1 is applied to a vehicle group decision circuit 12.

The vehicle group decision circuit 12 detects the vehicle group of the target vehicle 1, which is traveling ahead of one's own vehicle 2, from the entered data representing the target-vehicle image 1. (Since the vehicle group indicates the class of vehicle corresponding to vehicle size, in this embodiment groups are classified into light-duty automobiles, standard passenger cars, heavy-duty vehicles such as truck or bus, motorcycles or bicycles.) When the vehicle group is decided, a representative width w of this vehicle group is determined by referring to FIG. 4.

Figure 4:
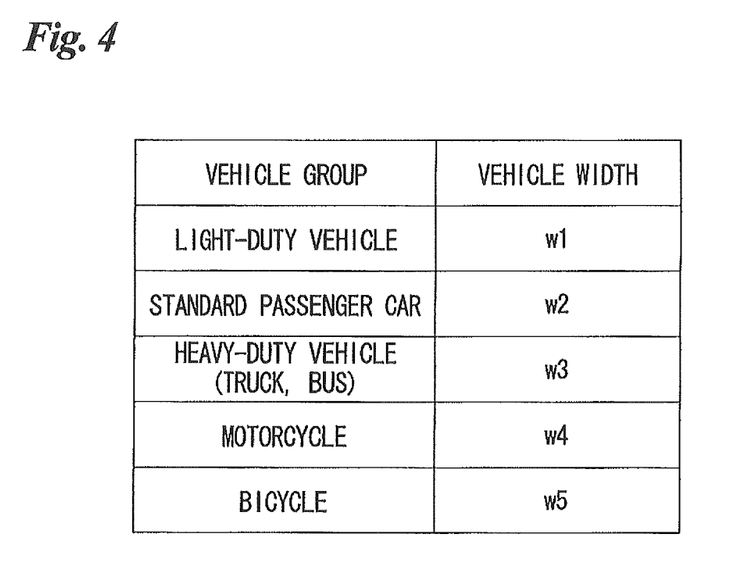
FIG. 4 is an example of a vehicle group table.

FIG. 4 is an example of a vehicle group memory contained in a vehicle width memory 13.

Representative vehicle widths of vehicle groups have been stored in the vehicle width memory in correspondence with the vehicle groups. It goes without saying that the vehicle groups that have been stored in the vehicle group memory correspond to vehicle groups that can be decided in the vehicle group decision circuit 12. Vehicle widths w1, w2, w3, w4 and w5 have been stored in correspondence with the vehicle groups, namely light-duty automobile, standard passenger car, heavy-duty vehicle (truck or bus), motorcycle and bicycle.

When the data representing the vehicle group decided in the vehicle group decision circuit 12 is input to the vehicle width memory 13, the data representing the representative vehicle width corresponding to this vehicle group is output from the vehicle width memory 13. The data representing the vehicle width is applied to a first distance calculation circuit 14.

When the vehicle group is decided, a number Na of pixels indicative of the width of the bottom side of the target-vehicle image 1 (see FIG. 3) is calculated as well.

Figure 5A:
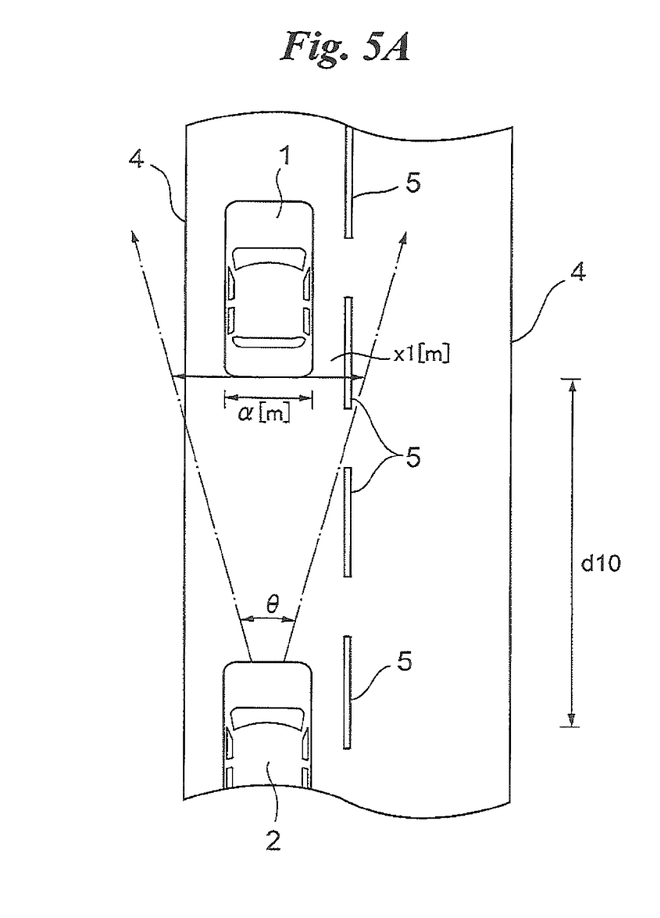
FIGS. 5A and 5B illustrate relationships between one's own vehicle and a target vehicle.

FIG. 5A is a plan view illustrating the positional relationship between one's own vehicle 2 and the target vehicle 1 at a certain time t1.

In FIG. 5A, a view angle θ of the camera 10 has been decided and a number Nw of pixels indicative of the width of the output image 30 also has been decided. If we let x1 represent the actual width capable of being imaged by the camera at the position of the rear end of target-vehicle image 1 and let d10 represent the distance from the target vehicle 1 to one's own vehicle 2, then Equation 1 below will hold.

$$d10 = x1/[2\tan(\theta/2)] \quad \text{Equation 1}$$

Further, since Nw:x1=Na:w holds, we have Equation 2 below.

$$x1 = Nw \times w/Na \quad \text{Equation 2}$$

Equation 3 below is obtained from Equations 1 and 2, and vehicle-to-vehicle distance d10 can be calculated from Equation 3.

$$d10 = Nw \times w/[2 \times Na \times \tan(\theta/2)] \quad \text{Equation 3}$$

Figure 5B:
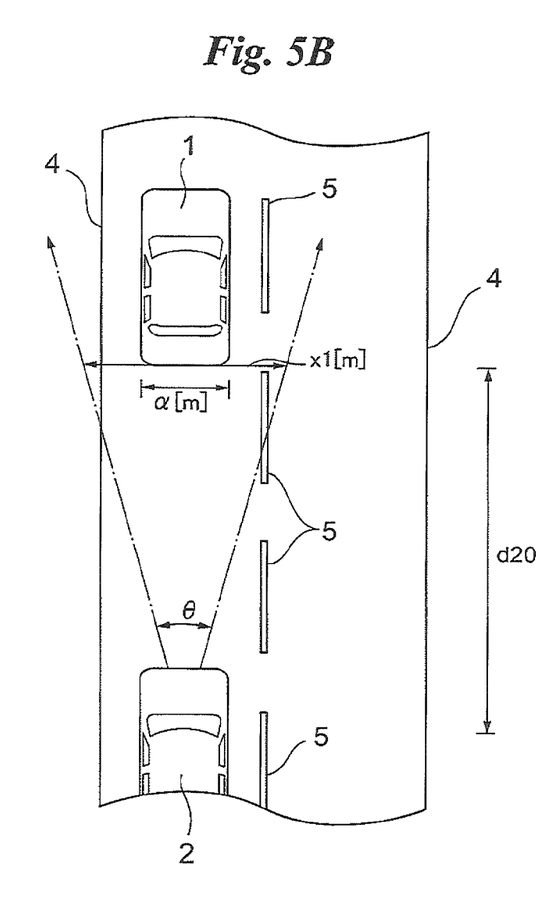

FIG. 5B is a plan view illustrating the positional relationship between one's own vehicle 2 and the target vehicle 1 at a time t2 reached upon elapse of a unit time from time t.

If we let d20 represent the vehicle-to-vehicle distance from one's own vehicle 2 to the target vehicle 1, then the vehicle-to-vehicle distance d20 can be calculated from Equation 4 below at time t2 in the manner set forth above.

$$d20 = Nw \times w/[2 \times Na \times \tan(\theta/2)] \quad \text{Equation 4}$$

The vehicle-to-vehicle distances d10 and d20 represent the first distance d1. Data representing the first distance d1 decided as set forth above is applied to a distance decision circuit 15.

The second distance calculation will be described next.

Figure 6:
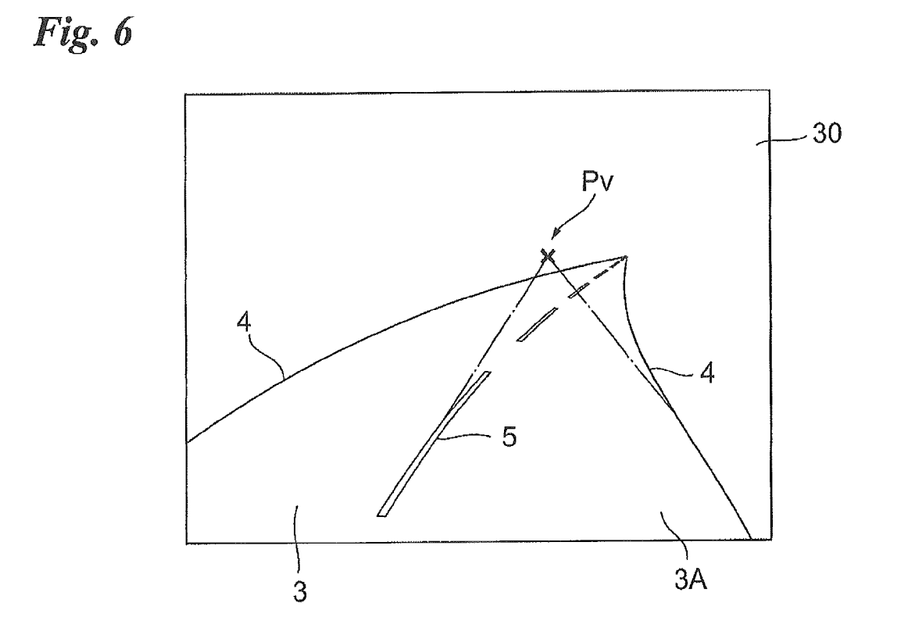
FIGS. 6 and 7 are examples of images obtained by imaging.

FIG. 6 is an example of image 30 obtained by imaging by the camera 10.

The image 30 contains a road image 3 (indicated by the same reference numeral as that of the road 3) representing the road 3 of the lane along which one's own vehicle 2 travels, and a road image 3A of the lane along which oncoming vehicles travel. An image 5 of the center line of the road is displayed between the road image 3 of one's own traveling lane and the road image 3A of the traveling lane of oncoming vehicles. Further, an image 4 of a roadway boundary block is displayed on the left side of the road image 3 and on the right side of the road image 3A.

In the second distance calculation, a vanishing point Pv is utilized in order to measure the distance to the target vehicle 1.

The vanishing point Pv is located at a position where an extension of the roadway boundary block 4 intersects an extension of the center line 5. In a case where either one of these cannot be found, the vanishing point Pv may be obtained by the position where either one of these intersects these parallel lines (e.g., an extension of a guard rail).

Figure 7:
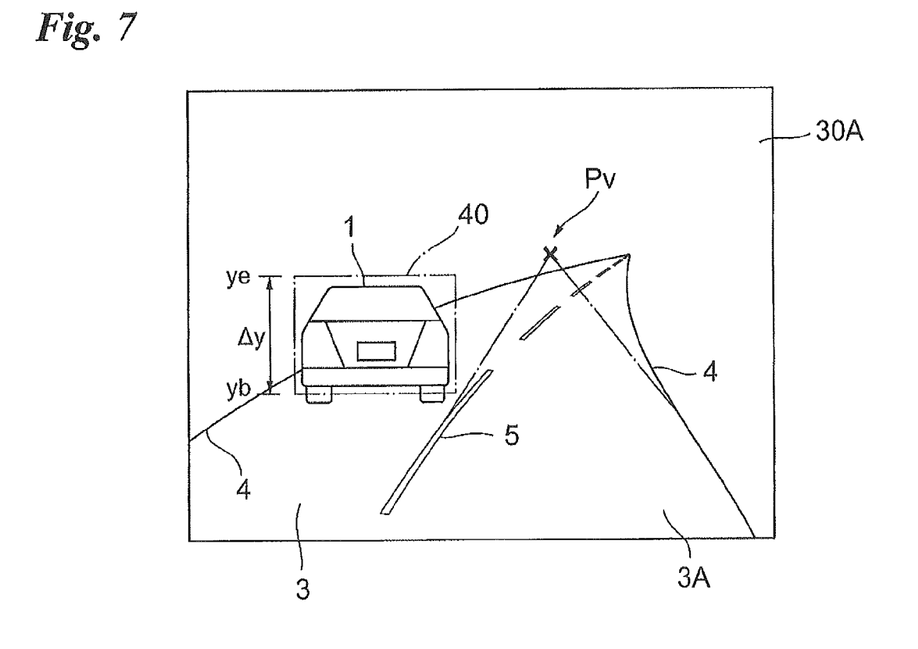

FIG. 7 is an example of an image 30A obtained by imaging.

The image 30A contains a target-vehicle image 1 representing the target vehicle 1 that travels ahead of one's own vehicle 2. A frame 40 that specifies the target-vehicle image 1 detected from the image 30A also is displayed surrounding the target-vehicle image 1.

A Y-coordinate (a coordinate along the vertical direction) position yb of the lower end of the target-vehicle image 1 is detected, and a Y-coordinate position ye of the vanishing point Pv is detected. The distance (second distance) d2 to the target vehicle 1 is calculated using the difference Δy between the detected positions yb and ye.

With reference again to FIG. 2, when what is ahead of one's own vehicle 2 is imaged by the camera 10, the image data representing the captured image is input to a vehicle image detection circuit 11. In the vehicle image detection circuit 11, the target-vehicle image 1 is detected from within the image 30 as mentioned above. Data representing the detected target-vehicle image 1 is applied to a lower edge position decision circuit 26.

The lower edge position decision circuit 26 detects the position yb of the lower edge of the target vehicle (target-vehicle image 1) traveling ahead of one's own vehicle 2. Data representing the detected position yb is input to a lower edge position correction circuit 27. The lower edge position correction circuit 27 corrects the detected lower edge position yb. The details concerning this correction processing will be described later. Data representing the lower-edge position corrected in the lower edge position correction circuit 27 is input to a second distance calculation circuit 29.

Further, data representing the image captured by the camera 10 is input to a vanishing point detection circuit 28 as well. The vanishing point detection circuit 28 detects the vanishing point from the captured image. Data indicating the position ye of the detected vanishing point also is input to the second distance calculation circuit 29.

The second distance calculation circuit 29 calculates the distance (second distance) d2 to the target vehicle 1 utilizing data such as the entered data indicating the vanishing-point position ye and data indicating the lower-edge position yb of the target vehicle 1.

With reference to FIG. 1, and as mentioned above, let d represent the vehicle-to-vehicle distance (second distance d2), let Δd represent the distance from the position at which the camera 10 is mounted on one's own vehicle 2 to the front end of one's own vehicle 2, and let h represent the height at which the camera 10 is mounted. Further, let Δh1 represent the height of the lower edge of the rear end of target vehicle 1 from the road 3.

With reference to FIG. 7, and as mentioned above, ye represents the Y-coordinate position of the vanishing point Pv in the image 30A obtained by imaging, and yb represents the Y-coordinate position of the lower edge of the rear end of the detected target-vehicle image 1. Further, Δy represents the distance between the Y-coordinate positions ye and yb.

If we let Δθ (rad) represent the angular resolution per Y-coordinate value 1 of camera 10, then Equation 1 below will hold.

$$dy \cdot \Delta\theta(\text{rad}) = (h - \Delta h1)/(d2 + \Delta d) \qquad \text{Equation 1}$$

The vehicle-to-vehicle distance (second distance d2) can be calculated from Equation (1). Data indicating the second distance d2 calculated in the second distance calculation circuit 29 is input to the distance decision circuit 15.

Figure 8:
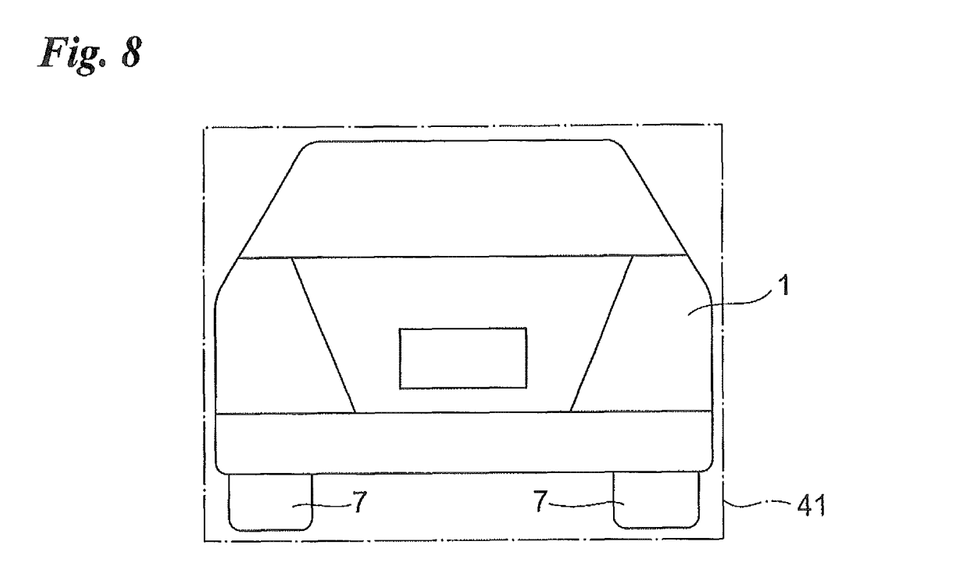
FIGS. 8 and 9 are examples of target-vehicle images.

FIG. 8 is one example of the target-vehicle image 1 detected from the captured image 30A.

The detected target-vehicle image 1 contains an image 7 of a tire. If the target vehicle is detected as the target-vehicle image 1 inclusive of the tire image 7, then a detection frame 41 at this time will be lower than the detection frame 40 that results when the tire image 7 is not contained in the target-vehicle image. As a consequence, the Y-coordinate position yb of the lower edge of the rear end of target-vehicle image 1 detected as set forth above will be lower by an amount commensurate with the tire image 7. As shown in FIG. 1, therefore, the second distance d2 will be calculated taking into consideration the portion equivalent to the height of the tire image 7 of the target vehicle 1. The second distance d2 is calculated in accordance with Equation 2 below.

$$dy \cdot \Delta\theta(\text{rad}) = h/(d2 + \Delta d) \qquad \text{Equation 2}$$

If the detected target-vehicle image 1 does not contain the tire image 7, the lower-edge position is corrected by the lower edge position correction circuit 13 in such a manner that the second distance d2 will be calculated based upon Equation 2. The determination as to whether the target-vehicle image 1 does not contain the tire image 7 may be made by verifying whether the tire image 7 is not included in the lower portion of the detection frame 40 or 41, or by verifying whether the tire image 7 is not included beneath the frame 40 or 41 on the outer side thereof.

Figure 9:
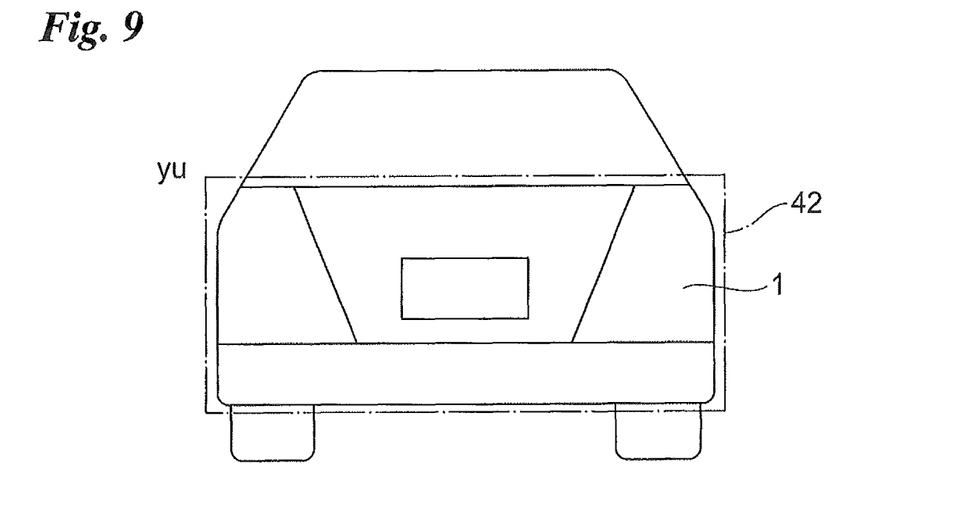

FIG. 9 is one example of the target-vehicle image 1 detected from the captured image 30A.

In the foregoing embodiment, the second distance d2 is calculated utilizing the Y-coordinate position yb of the lower edge of target-vehicle image 1. However, the second distance d2 can be calculated also by utilizing a Y-coordinate position yu of the upper edge of the rear end of target-vehicle image 1.

The rear end of the target-vehicle image 1 is detected and is enclosed by a detection frame 42. The detection frame 42 encloses the target-vehicle image 1 so as to exclude the rear window of the target vehicle. The upper edge of the detection frame 42 is the Y-coordinate position yu.

Figure 10:
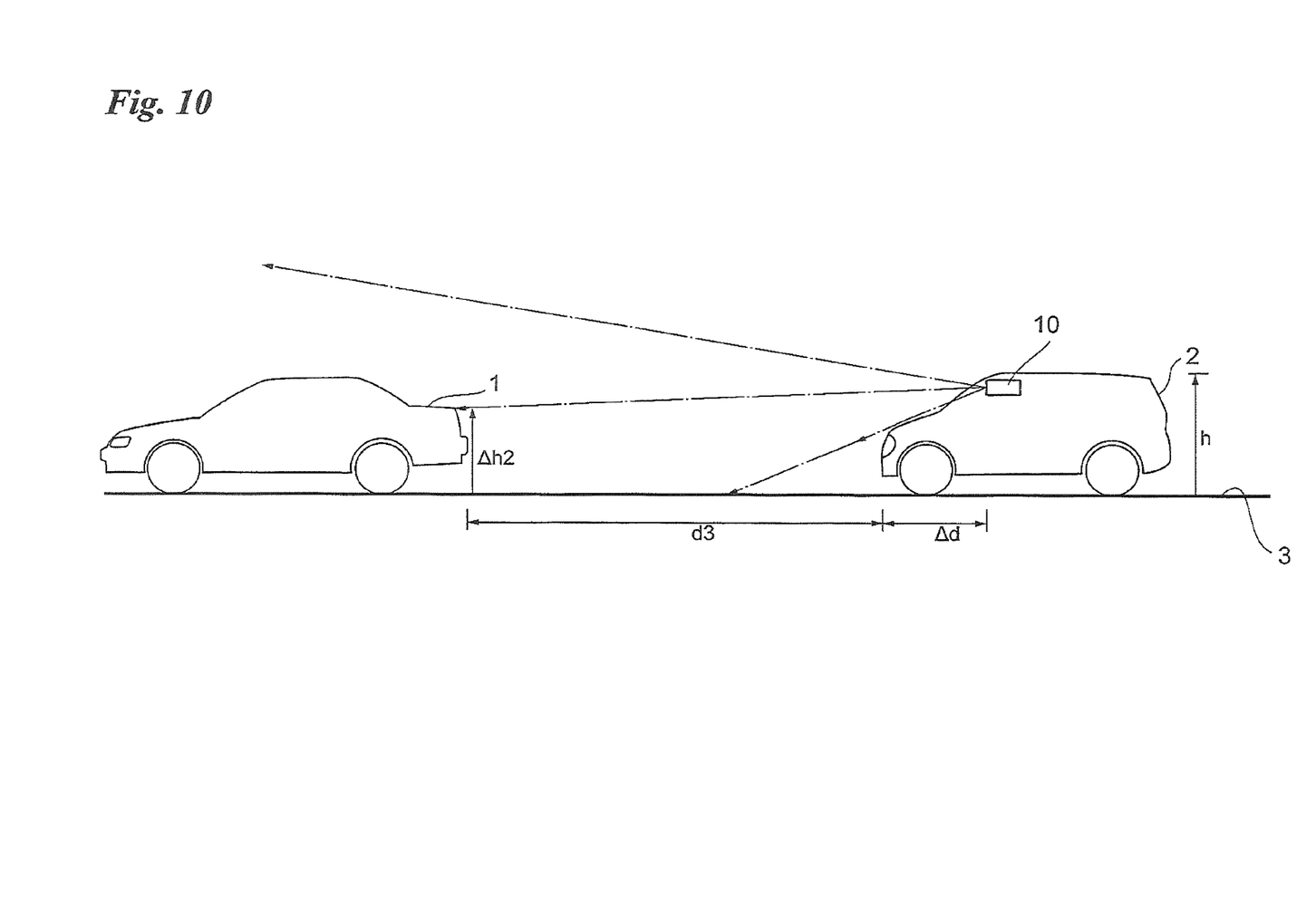
FIG. 10 illustrates the relationship between one's own vehicle and a target vehicle.

FIG. 10, which corresponds to FIG. 1, is a side view showing the relationship between one's own vehicle 2 and the target vehicle 1.

Since the upper portion of the rear end of target vehicle 1 is at a position having a height Δh2 from the road 3, the second distance d2 is calculated in accordance with Equation 3.

$$dy \cdot \Delta\theta(\text{rad}) = (h - \Delta h2)/(d2 + \Delta d) \qquad \text{Equation 3}$$

A more accurate second distance d2 can be calculated by adopting the average distance of second distance d2 (third distance) calculated from Equation 1 or 2 and second distance d2 (fourth distance) calculated from Equation 3 as the second distance d2. In a case where the second distance d2 is calculated in accordance with Equation 3, the upper-edge position yu would be decided in the above-described lower edge position decision circuit 26, and data representing the upper-edge position yu, the lower-edge position yb and the vanishing-point position ye would be input to the second distance calculation circuit 29.

The data representing the second distance d2 thus calculated is input to the distance decision circuit 15. Besides the data representing the first distance d1 calculated in the first distance calculation circuit 14, data representing the position of the vehicle image detected in the vehicle image detection circuit 11 and data indicating the position of the vanishing point detected in the vanishing point detection circuit 28 also are input to the distance decision circuit 15, as mentioned above.

The distance d to the target vehicle 1 is calculated in the distance decision circuit 15 in accordance with Equation 4 below. It should be noted that in Equation 4, d1 is the first distance calculated in the first distance calculation circuit 14, d2 is the second distance calculated in the second distance calculation circuit 29, and k is a weighting coefficient that varies in accordance with the distance from the target-vehicle image 1 to the vanishing point Pv.

$$d = (1-k) \times d1 + k \times d2 \qquad \text{Equation 4}$$

Figure 11:
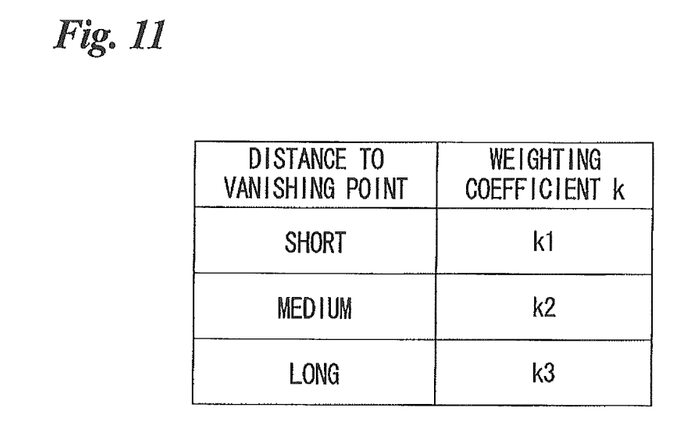
FIG. 11 illustrates the relationship between distance to a vanishing point and weighting coefficients.

FIG. 11 illustrates the relationship between distance from the target-vehicle image 1 to the vanishing point Pv and the weighting coefficient k.

If the distance from the target-vehicle image 1 to the vanishing point Pv is short, the weighting coefficient k is k1. Similarly, if the distance to the vanishing point Pv is neither short nor long but medium, then the weighting coefficient is k2. If the distance to the vanishing point Pv is long, the weighting coefficient is k3. It should be noted that 0<k1<k2<k3<1 holds. Accordingly, the shorter the distance from the target-vehicle image 1 to the vanishing point Pv, the less the vehicle-to-vehicle distance d decided based upon Equation 4 is influenced by the second distance d2 calculated based upon the vanishing point Pv. The closer the target-vehicle image 1 is to the vanishing point Pv, the more any error in calculation of the second distance d2 is influenced by any error in detection of the vanishing point Pv. However, since the closer the target-vehicle image 1 is to the vanishing point Pv, the more the influence of the second distance d2 upon the vehicle-to-vehicle distance d can be reduced, the influence that any error in detection of the vanishing point Pv has upon the vehicle-to-vehicle distance d can be diminished. The vehicle-to-vehicle distance d can thus be calculated comparatively accurately.

When data representing the vehicle-to-vehicle distance d is decided in the distance decision circuit 15 every unit time, the data representing the vehicle-to-vehicle distance d is input to a collision time calculation circuit 16, time measurement circuit 17 and driving display circuit 25.

The time measurement circuit 17 checks to determine whether a state in which the vehicle-to-vehicle distance is less than a hazardous distance at which the danger of a collision will occur has continued to a certain extent. If this state where the vehicle-to-vehicle distance is less than the hazardous distance continues to a certain extent, data indicative of this fact is applied from the time measurement circuit 17 to a warning unit 18. The warning unit 18 issues a warning to the driver of vehicle 2 in the form of a warning tone or warning display, etc. Further, a recording control unit 21 is controlled so that the image data captured by the camera 10 is recorded in a recording unit 22 as moving image data indicative of hazardous driving and as continuous still image data.

When the data representing the vehicle-to-vehicle distance is applied to the collision time calculation circuit 16 every unit time, the collision time calculation circuit 16 predicts the time at which the vehicle-to-vehicle distance will become zero. If the collision prediction time reaches a predetermined time, the collision time calculation circuit 16 applies data to this effect to the warning unit 18. The warning unit 18 issues a warning in the manner described above. Further, an engine control circuit 19 is controlled in such a manner that a collision will not occur, and the speed of one's own vehicle 2 is thus diminished.

Further, the speed of one's own vehicle 2 is detected by a speed detection circuit 24. Data indicating the detected speed is applied to the driving display circuit 25.

The driving display circuit 25 displays a graph indicative of a driver's driving tendency, which indicates the relationship between the traveling speed of one's own vehicle 2 and vehicle-to-vehicle distance.

Figure 12:
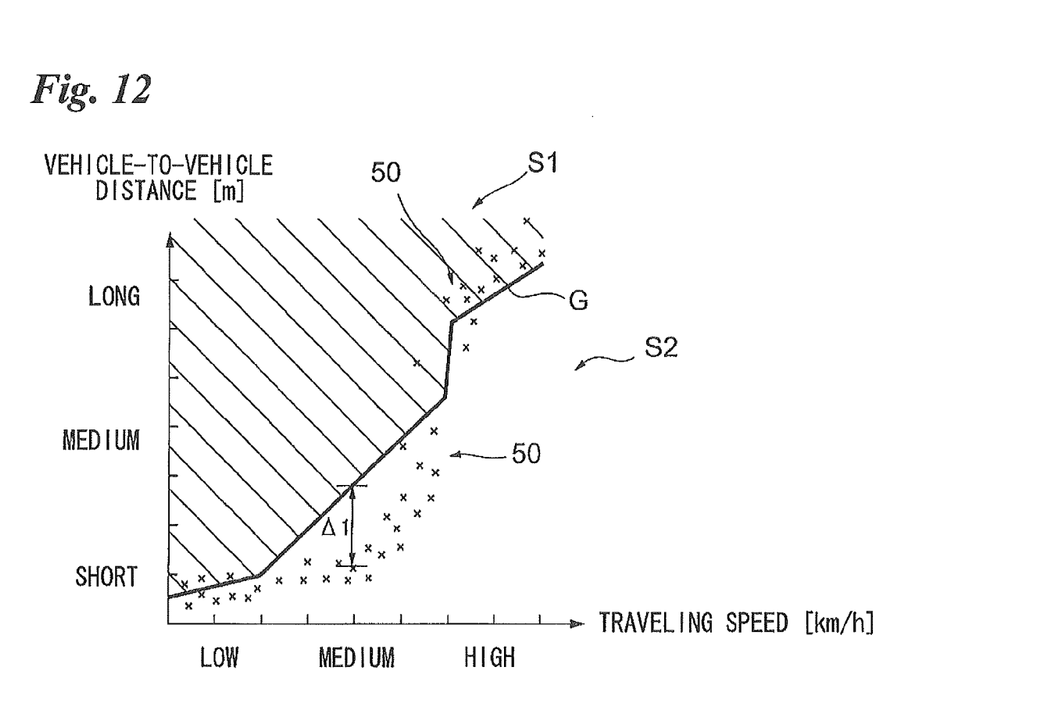
FIGS. 12 and 13 illustrate driving tendencies.
Figure 13:
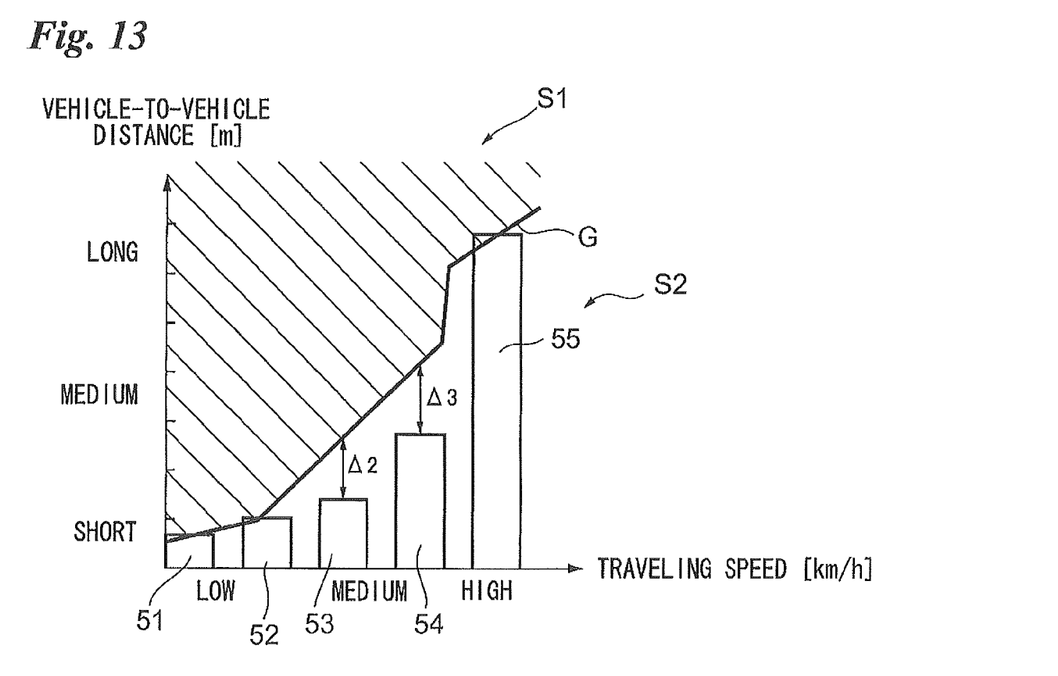

FIGS. 12 and 13 are examples of displays of driving tendency. In both examples the horizontal axis is a plot of traveling speed and the vertical axis a plot of vehicle-to-vehicle distance.

In FIGS. 12 and 13, a graph G indicates a relationship, which is considered safe for driving, between traveling speed and vehicle-to-vehicle distance.

The relationship between traveling speed and vehicle-to-vehicle distance illustrated by graph G changes depending upon the traveling speed. If traveling speed is low, a comparatively short vehicle-to-vehicle distance is acceptable. If traveling speed is medium, however, then a comparatively greater vehicle-to-vehicle distance is necessary. When traveling speed is high, a long vehicle-to-vehicle distance is necessary.

If vehicle-to-vehicle distance is greater than the vehicle-to-vehicle distance indicated by graph G such that the relationship between vehicle-to-vehicle distance and traveling speed falls within a region S1 indicated by the hatching, then this is indicative of a safe driving pattern. On the other hand, if the relationship between vehicle-to-vehicle distance and traveling speed falls within a region S2 so that the vehicle-to-vehicle distance is less than the vehicle-to-vehicle distance indicated by graph G, then this is indicative of a hazardous driving pattern. These patterns are obtained in conformity with traveling speed.

FIG. 12 illustrates safe driving and hazardous driving tendencies based upon a scatter diagram.

A number of points 50 indicating the relationship between traveling speed and vehicle-to-vehicle distance are illustrated as mentioned above. The driving tendency of the driver can be understood in accordance with the distribution of the points 50. In cases where traveling speed is low in FIG. 12, the driver is engaged in substantially safe driving, but when traveling speed rises to the medium level, the vehicle-to-vehicle distance shortens and the tendency indicated is one of hazardous driving. Further, it will be understood that when traveling speed is high, the vehicle-to-vehicle distance becomes long and the tendency indicated is one of safe driving. For example, an arrangement may be adopted in which a difference $\Delta 1$ between a required vehicle-to-vehicle distance and the actual vehicle-to-vehicle distance is calculated at a specific traveling speed and the driver is notified of the existence of this difference $\Delta 1$.

FIG. 13 illustrates driver tendency using a bar graph.

The relationship between traveling speed and vehicle-to-vehicle distance is illustrated by multiple bars 51 to 55 of the bar graph. It will be understood that whereas bars 51, 52 which result when traveling speed is low indicate that the necessary vehicle-to-vehicle distance exists, bars 53, 54 which result when traveling speed is medium indicate that the vehicle-to-vehicle distance is shorter than the necessary vehicle-to-vehicle distance and, hence, that driving is hazardous. Further, it will be understood that bar 55 which results when traveling speed is high indicates that the vehicle-to-vehicle distance is the necessary vehicle-to-vehicle distance and that driving is comparatively safe.

The driving tendency of the driver is thus displayed by the driving display circuit 25. The driver can dedicate himself to safe driving while viewing the display.

Further, an arrangement may be adopted in which data indicating the relationship between calculated traveling speed and vehicle-to-vehicle distance is extracted and the above-described driving display is presented at the driver's home or office or the like at the conclusion of driving.

In the foregoing embodiment, in the case where the first vehicle-to-vehicle distance d1 is calculated, the vehicle group of a target vehicle is decided from the width of a target-vehicle image and distance to the target vehicle is calculated based upon the vehicle width that corresponds to the vehicle group decided. However, an arrangement may be adopted in which the height of the target-vehicle image is detected, the group of the target vehicle is decided from the detected height, and the distance to the target vehicle is calculated based upon the vehicle height that corresponds to the vehicle group decided. In this case, rather than the vehicle width memory 13, use would be made of a vehicle height memory in which a vehicle height has been stored for every vehicle group.

A license plate differs for every vehicle group such as light-duty vehicle, standard passenger car and heavy-duty vehicle. The vehicle image detection circuit 11 may therefore be adapted so as to detect the image of the license plate of the target vehicle and decide the vehicle group of the target vehicle from the detected image of the license plate. Further, it may be so arranged that in a case where a vehicle group cannot be determined by the vehicle group decision circuit 12, the vehicle group is determined by referring to the image of the license plate.

As many apparently widely different embodiments of the present invention can be made without departing from the spirit and scope thereof, it is to be understood that the invention is not limited to the specific embodiments thereof except as defined in the appended claims.

What is claimed is:

1. A vehicle-to-vehicle distance calculation apparatus comprising:

an imaging control device for controlling a camera, which has been mounted on one's own vehicle, so as to image a target vehicle present ahead of one's own vehicle;

a vehicle group decision device for deciding to what group the target vehicle belongs based upon an image obtained by imaging by the camera;

a target vehicle pixel count calculation device for calculating number of width or height pixels of a target image contained in an image obtained by imaging by the camera;

a first distance calculation device for calculating the distance to the target vehicle based upon a representative vehicle width or vehicle height of the vehicle group decided by said vehicle group decision device, the number of pixels calculated by the target vehicle pixel count calculation device and the number of width or height pixels of the image obtained by imaging by the camera;

a target-vehicle image detection device for detecting a target-vehicle image, which represents a target vehicle, from within the image obtained by imaging by the camera;

a vanishing point detection device for detecting a vanishing point from within the image obtained by imaging by the camera;

a second distance calculation device for calculating the distance to the target vehicle based upon a position of at least one of an upper edge and lower edge of the target-vehicle image detected by said target-vehicle image detection device and position of the vanishing point detected by said vanishing point detection device; and a distance decision device for deciding the distance to the target vehicle from the first distance calculated by said first distance calculation device and the second distance calculated by said second distance calculation device upon applying weighting such that the closer together the position of the target-vehicle image detected by said target-vehicle image detection device and position of the vanishing point detected by said vanishing point detection device, the smaller the weight of the second distance calculated by said second distance calculation device becomes.

2. The apparatus according to claim 1, further comprising a vehicle memory in which representative vehicle widths or vehicle heights have been stored beforehand on a per-vehicle-group basis;

wherein said first distance calculation device calculates the distance to the target vehicle based upon a representative vehicle width or vehicle height of the vehicle group, which has been decided by said vehicle group decision device, from among the representative vehicle widths or vehicle heights that have been stored in said vehicle memory, the number of pixels calculated by said target vehicle pixel count calculation device, and the number of width or height pixels of the image obtained by imaging by the camera.

3. The apparatus according to claim 1, wherein said first distance calculation device includes:

a third distance calculation device for calculating a third distance to the target vehicle based upon the upper edge of the target-vehicle image detected by said target-vehicle image detection device and the position of the vanishing point detected by said vanishing point detection device; and a fourth distance calculation device for calculating a fourth distance to the target vehicle based upon the lower edge of the target-vehicle image detected by said target-vehicle image detection device and the position of the vanishing point detected by said vanishing point detection device;

the distance to the target vehicle being calculated based upon the third distance calculated by said third distance calculation device and the fourth distance calculated by said fourth distance calculation device.

4. The apparatus according to claim 1, further comprising:

a determination device for determining whether a tire of the target vehicle is absent below the lower edge of the target vehicle detected by said target-vehicle image detection device; and a correction device for correcting the position of the lower edge of the target vehicle, which has been detected by said target-vehicle image detection device, in response to a determination by said determination device that a tire is absent;

wherein said second distance calculation device calculates the distance to the target vehicle using the position of the lower edge corrected by said correction device.

5. A vehicle-to-vehicle distance calculation method comprising the steps of:

controlling a camera, which has been mounted on one's own vehicle, so as to image a target vehicle present ahead of one's own vehicle;

deciding to what group the target vehicle belongs based upon an image obtained by imaging by the camera;

calculating number of width or height pixels of a target image contained in an image obtained by imaging by the camera;

calculating the distance to the target vehicle based upon a representative vehicle width or vehicle height of the vehicle group decided, the number of pixels calculated and the number of width or height pixels of the image obtained by imaging by the camera;

detecting a target-vehicle image, which represents a target vehicle, from within the image obtained by imaging by the camera;

detecting a vanishing point from within the image obtained by imaging by the camera;

calculating the distance to the target vehicle based upon a position of at least one of an upper edge and lower edge of the target-vehicle image detected and position of the vanishing point detected; and deciding the distance to the target vehicle from the first distance calculated and the second distance calculated upon applying weighting such that the closer together the position of the target-vehicle image detected and position of the vanishing point detected, the smaller the weight of the second distance calculated becomes.

* * * * *